Oct. 21, 1969     I. SZODFRIDT     3,473,327
HYDRODYNAMIC TORQUE CONVERTER, ESPECIALLY
FOR TRANSMISSIONS OF MOTOR VEHICLES
Filed Dec. 12, 1967
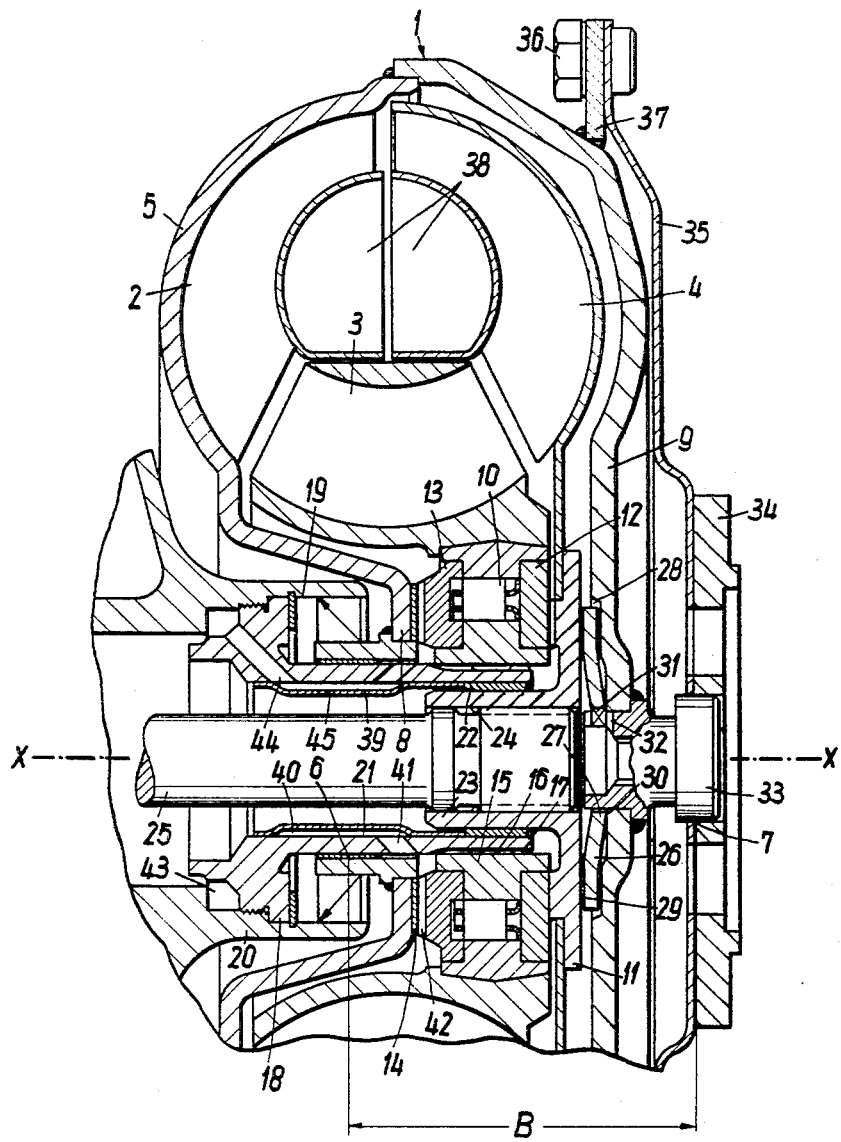
Inventor:
IMRE SZODFRIDT
BY: Craig & Antonelli
ATTORNEYS United States Patent Office 3,473,327
Patented Oct. 21, 1969

3,473,327
HYDRODYNAMIC TORQUE CONVERTER, ESPECIALLY FOR TRANSMISSIONS OF MOTOR VEHICLES
Imre Szodfridt, Ditzingen, Germany, assignor to Firma Dr. Ing. h.c.F. Porsche K.G., Stuttgart-Zuffenhausen, Germany
Filed Dec. 12, 1967, Ser. No. 689,983
Claims priority, application Germany, Jan. 27, 1967, P 41,291
Int. Cl. F16h 41/04; F04d 29/18
U.S. Cl. 60—54
18 Claims

ABSTRACT OF THE DISCLOSURE

A hydrodynamic torque converter, especially for combination change-speed transmissions of motor vehicles, which includes a pump wheel formed by the rotating housing, a turbine wheel and a guide wheel whereby the guide wheel and the turbine wheel are swingingly supported on support surfaces between adjacent walls of the torque converter housing and are held in force-locking connection by a supporting disk which is inserted freely adjustable in the axial direction between an inner part of the torque converter and the adjacent housing wall.

The present invention relates to a hydrodynamic torque converter, especiall for compound transmissions of motor vehicles, which comprises a guide wheel and a turbine wheel arranged within a rotating housing which is constructed simultaneously as a pump wheel.

Hydrodynamic torque converters which are incorporated as a structural unit in the axle drive into a drive block consisting of internal combustion engine, of the change-speed transmission and of the differential gear, necessarily posses a small support base for the rotating pump housing. Owning to tolerance summation between the end bearings of the structural unit, inclined positions of the pump housing relative to its axis of rotation occur whereby the inner parts of the torque converter such as the guide and turbine wheel cant or tilt. This has, as a possible consequence, the jamming of parts of the guide or turbine wheel which may cause a seizing of the turbine wheel in the torque converter housing or breaking of axial guide bearings for the guide wheel. In order to avoid these costly damages, as large as possible a support base for the torque converter housing is aimed at in the prior art constructions, or if this is not possible for assembly reasons, an exact assembly with narrow tolerances is then sought. However, limitations are imposed to all of these measures because the alternating play between thrust and tension loads of the torque converter and its heat generation permits only with difficulty an unequivocal, well-defined dimensioning of the inner parts of the torque converter which slide along one another.

The aim of the present invention, in contradistinction thereto, essentially consists in creasing a torque conventer which overcomes these problems involved in the inclination of its torque converter housing and which provides a mounting and support of its inner parts which precludes jamming or wedging thereof.

This is achieved according to the present invention in that the guide wheel by way of its associated free-wheeling device, and the turbine wheel and its hub are swingingly or oscillatingly retained in force-locking connection on their counter supports between the adjacent walls of the torque converter housing under the effect of as upport disk, which is inserted freely—adjustably in the axial direction between one of the inner parts of the torque converter and the adjacent housing wall. Edge pressures of the inner parts of the torque converter which slide along one another are thereby precluded so that a relatively small support base for the torque converter suffices. The support disk, which is advantageously inserted with axial play between the driving flange of the turbine wheel and the wall of the torque converter housing adjacent the same, is centered at its inner circumference in the wall and is connected with the torque converter housing in the direction of rotation so that the additional expenditures required for the alignment of the inner parts of the torque converter in the respectively prevailing direction of force are slight. In particular, larger tolerance plays can be permitted by these measures without lessening the safety of operation of the torque converter. The oscillating or swinging support of guide and turbine wheel takes place preferably by means of bearing surfaces of small axial length at mutually opposite abutment surfaces of a stationary hollow hub extending into the torque converter housing. According to one advantageous construction, the hollow hub extending into the torque converter housing contains a bushing that forms an annular space for the supply of the operating midum for the torque converter.

Accordingly, it is an object of the present invention to provide a hydrodynamic torque converter, especially for combination change-speed transmissions of motor vehicles, which avoids the aforementioned shortcomings and drawbacks encountered with prior art constructions.

Another object of the present invention resides in a hydrodynamic torque converter for a change-speed transmission of motor vehicles which excels by reliability and safety in operation without involving costly measures and complicated, as well as expensive, constructions.

A still further object of the present invention resides in a hydrodynamic torque converter of the type described above which lessens the requirements for small tolerances in the dimensions of the finished component parts without jeopardizing the safety of operation of the torque converter.

Still another object of the present invention resides in a hydrodynamic torque converter in which edge pressures and possible failures are effectively avoided which might otherwise be caused by improper or inadequate alignment of the various parts.

These and other objects, features and advantages of the present invention will become more obvious from the following description when taken in connection with the accompanying drawing which shows, for purposes of illustration only, one embodiment in accordance with the present invention and wherein:

The single figure is a longitudinal cross-sectional view through a torque converter for the combination transmission of a motor vehicle with the mounting and support of the inner parts of the torque converter constructed in accordance with the present invention.

Referring now to the single figure of the drawing, the hydrodynamic torque converter generally designated by reference numeral 1 comprises conventionally a pump wheel 2, a guide wheel 3 and a turbine wheel 4. The pump wheel 2 forms a part of the torque converter housing 5, which rotates with a support base B in sliding bearings 6 and 7 about the axis of rotation X—X. The free-wheeling device 10 of any conventional construction associated with the guide wheel 3 and the driving flange 11 of the turbine wheel 4 are arranged between the walls 8 and 9 of the torque converter housing 5, which are directed perpendicularly to the axis of rotation X—X. The free-wheeling device 10 is retained between support disks 12 and 13, which serve simultaneously as entrainment members for the guide wheel 3. The lateral disk 13 is supported by means of a sliding ring 14 in the wall 8 of the torque converter housing 5 and the lateral disk 12 is supported at the driving flange 11 of the turbine wheel 4. The inner ring 15 of the free-wheeling device 10 is swingingly or oscillatingly supported by means of teeth 16 of short structural length on the partially toothed outer surface 17 of a hollow hub 18, which extends into the torque converter housing 5. The hollow hub 18 is fitted into the aperture 19 of a transmission housing 20, shown in part only, which surrounds the torque converter. The hub 23 of the turbine wheel 4, which is made in one piece with the drive flange 11, is also swingingly or oscillatingly supported at the inner surface 21 of the hollow hub 18 by way of a bearing bushing 22 whereby the bearing surfaces of both inner parts 3 and 4 of the torque converter are disposed in a common transverse plane. The drive shaft 25 of the change-speed transmission, connected to the output of the hydrodynamic torque converter is in engagement with the hub 23 of the turbine wheel 4 by means of a centered spline-shaft profile 24 of conventional construction. The change-speed transmission, preferably a conventional planetary gear transmission, is not illustrated in detail since it forms no part of the present invention. For purposes of force-locking connection of the inner parts 10 to 15 of the torque converter in the axial direction, a support disk 26 is inserted between the walls 8 and 9 of the torque converter housing 5 which is retained, with small axial play, freely adjustable between the wall 9 and the driving flange 11 of the turbine wheel 4. The support disk 26 is centered at its inner circumference 27 with radial play in an aperture 28 coaxial to the axis of rotation X—X within the torque converter part 9 and possesses sliding surfaces 29 and 30 coated, for example, with bronze or the like for engagement with the coordinated counter-surfaces of the torque converter housing 5 and the driving flange 11 of the turbine wheel 4. The support disk 26 is connected for rotation in unison with the torque converter housing 5 by a number of claws 31 provided at its inner circumference. The claws 31 engage in apertures 32 of the bearing pin 33 of the torque converter housing and form a tilting or rocker bearing which enables equalization or compensation movements perpendicularly to the axis of rotation X—X. The tilting or rocker bearing of the support disk 26 may also be replaced by a swinging or oscillating ball joint bearing or the like. The bearing pin 33 of the torque converter housing is guided in the bearing bore 7 of a driving disk 34 which is adapted to be connected with the driving engine (not shown). The drive of the torque converter housing 5 takes place by an elastically yielding entrainment disk 35 which is secured by means of bolts 36 at a flange 37 of the torque converter housing.

For purposes of supplying the operating liquid to the working space 38 of the torque converter, constructed as a closed structural unit, a bushing 39 is inserted into the hollow hub 18, which together with the inner surface 21 of the hollow hub 18, forms an annular space 40. The operating liquid reaches the working space 38 from annular space 40 by way of bores 41 and through radially directed slots 42 between the wall 8 and the lateral disk 13. The supply of the operating liquid into the annular space 40 takes place by means of a filling pump (not shown) by way of the annular channel 43 in the transmission housing and bores 44 in the hollow hub 18. The return flow of the operating liquid is controlled by a return nozzle 45 provided in the bushing 39.

If, during assembly or during the operation of the torque converter, a displacement or change of the support points in the bearing places 6 and 7 of the support base B occurs, with the consequence of a tilting or inclined position of the torque converter housing 5, then the inner parts 10–15 of the torque converter are able to follow this positional deviation or change by the provided mounting and support thereof. The force-locking connection of the inner parts 10 to 15 of the torque converter is maintained by the support disk 26 which also swingingly adjusts itself to the occurring inclined position of the torque converter housing. Since all of the individual parts or units participating in the torque conversion are thus able to align themselves to the position of the torque converter housing, no edge pressures occur so that the parts slide along one another with their respective corresponding difference of rotational speed. The lubrication of the sliding surfaces takes place by the operating liquid of the torque converter which, in addition to being supplied to the sliding surfaces of the torque-converter inner parts, is also supplied by way of the annular space to the bearings 6 and 22 and supplies the same with a correspondingly dimensioned lubricant film.

While I have shown and described only one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as would be apparent to one with normal skill in the pertinent technology.

I claim:

1. A hydrodynamic torque converter, especially for combination transmissions of motor vehicles, which includes a guide wheel and a turbine wheel arranged in a rotating housing means, forming simultaneously a pump wheel, wherein the improvement comprises:

support means in the torque converter for the guide wheel and the turbine wheel, and means for swingingly supporting the guide wheel by way of its associated free-wheeling means and the turbine wheel by means of its hub portion on the support means, including support disk means for holding said guide and turbine wheel in force-locking connection on said support means between adjacent walls of the torque converter housing means, said support disk means being inserted freely adjustable in the axial direction between an inner part of the torque converter and the adjacent housing wall.

2. A torque converter according to claim 1, wherein said turbine wheel includes a driving flange, said support disk means being inserted with axial play between said driving flange and the wall of the torque converter housing means adjacent said driving flange, and said support disk means being centered at its inner circumference and being operatively connected with the torque converter housing means for rotation in unison therewith.

3. A torque converter according to claim 1, wherein the means for swingingly supporting the guide and turbine wheels includes a stationary hollow hub extending into the torque converter housing means and takes place by means of bearing surface means of small axial length at oppositely disposed abutment surfaces of said hollow hub.

4. A torque converter according to claim 3, wherein said hollow hub includes bushing means forming an annular space for the supply of the operating medium for the torque converter.

5. A torque converter according to claim 4, wherein said turbine wheel includes a driving flange, said support disk means being inserted with axial play between said driving flange and the wall of the torque converter housing means adjacent said driving flange, and said support disk means being centered at its inner circumference and being operatively connected with the torque converter housing means for rotation in unision therewith.

6. A hydrodynamic torque converter, comprising rotating housing means forming a pump wheel, a guide wheel and a turbine wheel arranged in said housing means, and support means for said guide wheel and said turbine wheel in said torque converter to enable rocking movements thereof in order to permit readjustment and realignment thereof in case of change in the position of said housing means.

7. A torque converter according to claim 6, further comprising support disk means located between an inner part of the torque converter and a wall of the housing means to assure a force-locking connection of the turbine and guide wheels with the support means thereof.

8. A torque converter according to claim 7, wherein said support disk means is inserted between said inner part and said wall with axial play.

9. A torque converter according to claim 8, wherein said turbine wheel includes a hub portion, free-wheeling means for said guide wheel, said turbine wheel and said guide wheel being rockingly supported by way of said hub portion and free-wheeling means, respectively.

10. A torque converter according to claim 9, wherein said turbine wheel includes a driving flange, said support disk means being inserted between said driving flange and the wall of the torque converter housing means adjacent the driving flange and being center at its inner circumference and operatively connected with the torque converter housing means for rotation in unison therewith.

11. A torque converter according to claim 10, wherein the means for rockingly supporting the guide and turbine wheels includes a stationary hollow hub extending into the torque converter housing means and bearing surface means of relatively small axial length.

12. A torque converter according to claim 11, further comprising bushing means for said hollow hub forming an annular space for the supply of the operating medium of the torque converter.

13. A torque converter according to claim 6, wherein the means for rockingly supporting the guide and turbine wheels includes a stationary hollow hub extending into the torque converter housing means and bearing surface means of relatively small axial length.

14. A torque converter according to claim 13, further comprising bushing means for said hollow hub forming an annular space for the supply of the operating medium of the troque converter.

15. A torque converter according to claim 7, wherein said turbine wheel includes a driving flange, said support disk means being inserted between said driving flange and the wall of the torque converter housing means adjacent the driving flange and being centered at its inner circumference and operatively connected with the torque converter housing means for rotation in unison therewith.

16. A torque converter according to claim 15, wherein said support disk means is inserted between said inner part and said wall with axial play.

17. A torque converter according to claim 15, wherein the means for rockingly supporting the guide and turbine wheels includes a stationary hollow hub extending into the torque converter housing means nad bearing surface means of relatively small axial length.

18. A torque converter according to claim 17, further comprising bushing means for said hollow hub forming an annular space for the supply of the operating medium of the torque converter.

References Cited

UNITED STATES PATENTS

| | | | |
|---|---|---|---|
| 2,663,148 | 12/1953 | Jandasek | 60—54 |
| 3,024,735 | 3/1962 | Zeidler | 60—54 XR |
| 3,213,622 | 10/1965 | Liang | 60—54 |
| 3,300,971 | 1/1967 | Qualman et al. | 60—54 |

EDGAR W. GEOGHEGAN, Primary Examiner

U.S. Cl. X.R.

103—115